(12) United States Patent  (10) Patent No.: US 6,632,249 B2
Pollock  (45) Date of Patent: Oct. 14, 2003

(54) METHOD FOR PROVIDING WEB-BASED SERVICES TO AN APPLICATION PROGRAM MODULE

(75) Inventor: Joshua M. Pollock, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 458 days.

(21) Appl. No.: 09/760,529

(22) Filed: Jan. 16, 2001

(65) Prior Publication Data

US 2002/0059261 A1 May 16, 2002

Related U.S. Application Data

(63) Continuation-in-part of application No. 09/602,124, filed on Jun. 23, 2000, now Pat. No. 6,493,733.

(51) Int. Cl.[7] .............................................. G06F 17/21

(52) U.S. Cl. ................................... 715/513; 715/501.1

(58) Field of Search ............................ 715/513, 501.1, 715/530, 531; 345/733, 740, 749, 760

(56) References Cited

U.S. PATENT DOCUMENTS

| | | | | | |
|---|---|---|---|---|---|
| 5,724,595 | A | * | 3/1998 | Gentner | 707/501.1 |
| 5,845,299 | A | * | 12/1998 | Arora et al. | 707/513 |
| 5,956,736 | A | * | 9/1999 | Hanson et al. | 707/513 |
| 5,995,101 | A | * | 11/1999 | Clark et al. | 345/711 |
| 6,151,609 | A | * | 11/2000 | Truong | 707/505 |
| 6,178,432 | B1 | * | 1/2001 | Cook et al. | 707/513 |
| 6,266,684 | B1 | * | 7/2001 | Kraus et al. | 707/513 |
| 6,278,448 | B1 | * | 8/2001 | Brown et al. | 345/866 |
| 6,321,242 | B1 | * | 11/2001 | Fogg et al. | 707/513 |
| 6,343,302 | B1 | * | 1/2002 | Graham | 707/501.1 |
| 6,362,840 | B1 | * | 3/2002 | Burg et al. | 345/835 |

OTHER PUBLICATIONS

*Demostrational automation of text editing tasks involving multiple focus points and conversions;* Yuzo Fujishima; Proceedings of the 1998 international conference on Intelligent user interfaces, 1998, pp. 101–108.

*Object–oriented hardware modelling—where to apply and what are the objects?;* G. Schumacher and W. Nebel; *Proceedings of the conference with EURO–VHDL '96 and exhibition on European Design Automation,* 1996, pp. 428–433.

*Development and validation of a systems macro model using isolated micro models;* Drazen Kostelski, John Buzacott, Kenneth McKay and Xiao–Gao Liu; *Proceedings of the 1987 conference on Winter simulation,* 1987, pp. 669 676.

(List continued on next page.)

*Primary Examiner*—Stephen S. Hong
(74) *Attorney, Agent, or Firm*—Merchant & Gould (57) ABSTRACT

A method for using a web page to perform web-based services on a document of an application program module is provided by one embodiment of the invention. A user editing a document running on an application program module selects to view web-based services that may be performed on the user's document. In response to the user's selection, the application program module hosts a services web page in a dialog box of the application program module using an HTML rendering engine. The services web page may list a number of services or features that may be performed on a user's document. The services may be listed as a number of links. In response to the user selecting one of the services, the HTML rendering engine is directed to the selected web page. The web page script of the selected web page requests that the application program module expose its object model to the web page script. After verifying any security issues, the application program module sends to the web page script a pointer to its object model. The web page script is then able to use the application's object model to perform the selected feature.

20 Claims, 6 Drawing Sheets

OTHER PUBLICATIONS

*Abstraction–based software development*; Valdis Berzins, Michael Gray and David Naumann; *Commun. ACM 29*, 5 (May. 1986), pp. 402–415.

*Teaching OLE automation: a problem–based learning approach*; Raymond P. Kirsch; *Proceedings of the twenty–seveth SIGCSE technical symposium on Computer science education*, 1996, pp. 68–72.

*Modern languages and Microsoft's component object model;* David N. Gray, John Hotchkiss, Seth LaForge, Andrew Shalit and Toby Weinberg; Commun. ACM 41, 5 (May. 1998), pp. 55–65.

Denise Tyler, Laura Lemay's Web Workshop, Microsoft FrontPage(TM) 97, Sams, Macmillan Computer Publishing, Jan. 1997, pp. 11–31.*

SoftQuad Hot Metal Pro(TM) 3.0 User Manual, SoftQuad Inc., 1996, pp. 5–23 and 119–127.*

* cited by examiner

METHOD FOR PROVIDING WEB-BASED SERVICES TO AN APPLICATION PROGRAM MODULE

REFERENCE TO RELATED APPLICATIONS

This is a continuation-in-part of U.S. application Ser. No. 09/602,124, entitled "METHOD FOR INSERTING INTERACTIVE HTML OBJECTS INTO AN ELECTRONIC FILE", filed Jun. 23, 2000 now U.S. Pat. No. 6,493,733 B1, commonly assigned and incorporated by reference herein

TECHNICAL FIELD

The invention generally relates to providing web-based services to an application program module.

BACKGROUND

Oftentimes, software developers want to update a software application program module after the application has already been shipped to the client. For example, developers may want to add a new feature to the application or fine tune an existing feature. One way of editing or adding a feature is to send out a new release of the software application to customers either by shipping a new disc or by having users download the new feature. Although these approaches work fairly well for editing or adding features, each new edited or added feature may require another update. Periodically updating an application with new or edited features is expensive and burdensome for both the software manufacturer and the user. Also, with regard to downloading new or edited features, there is a discoverability issue because many users will not know that a new feature exists and, thus, will not know to download the new feature. There is a need for a method and system for providing features of a software application that is easily discoverable, inexpensive and capable of being easily updated.

Users of software applications desire more advanced features than users did in the past. Software manufacturers cannot compete in the marketplace by simply providing the same features as they once did. New features must be added and updated at a rapid pace. For example, some users of word processors may find helpful a language translation engine. Even though third parties may provide translation services via the Internet, these services are not easily discoverable. Moreover, even if a user discovers these language translation services, the translation services may require the user to exit their word processor and send their word processing document over the Internet to the translation service. This process can be time-consuming and burdensome.

One solution is to include the advanced features, such as the translation software, with the application program module. However, some users may not use the advanced features. It is difficult to predict which features may be needed in the future and which features will be popular with users. Moreover, application software developers may not be skilled in developing these advanced features. A partnership between an application program manufacturer and a skilled feature developer could prove beneficial. Thus, there is a need for a method and system for providing advanced features in a software application program module that facilitates partnerships between software manufacturers. Moreover, these features should be highly discoverable, editable, and seamless to the user.

SUMMARY OF THE INVENTION

The present invention meets the above-described needs with a method and system for providing web-based services to an application program module.

Generally described, in one embodiment, the invention allows a web page script to manipulate a document running on an application program module by using the application's object model. The web page script may use the application's object model to implement features or services on the document running on the application program module. The invention may be launched when the user selects a tool entitled "eServices" or "Tools on the Web" while editing a document in an application program module, such as the "PUBLISHER" desktop publishing program module. The selection of the "eServices" tool causes the application program module to host a services web page in a dialog box. The web page may display a number of features or services that may be performed on the user's document. For example, there may be a translation feature to translate the user's document into another language. Of course, there are numerous other features that may be listed on the web page. When the user selects one of the features from the web page, a web page script performs the selected function on the user's document. The web page's script uses the object model of the application program module to perform the selected function on the document in accordance with OLE Automation.

More specifically, in one embodiment, the invention comprises an application program module creating a dialog box and launching an HTML rendering engine in the dialog box. The HTML rendering engine opens a services web page in the dialog box. The services web page comprises at least one link for a service or feature that the user may select. After selecting one of the links, the web page script associated with the selected link requests access to the object model of the application program module. The application program module sends a pointer to its object model to the web page script. The web page script is then able to use the application's object model to perform the selected service or feature on the user's document (running in the application program module).

That the invention improves over the drawbacks described in the Background section and accomplishes the advantages described above will become apparent from the following detailed description of the exemplary embodiments and the appended drawings and claims.

DETAILED DESCRIPTION OF EMBODIMENTS OF THE INVENTION

An embodiment of the present invention will be incorporated into the "PUBLISHER" desktop publishing program module manufactured by Microsoft Corporation of Redmond, Wash. Briefly described, in one embodiment, the invention allows a web page script to manipulate a document running on an application program module by using the application's object model. The web page script may use the application's object model to implement features or services on the document running on the application program module. A feature, or service, will be used herein to refer to an action or manipulation that may be performed on a document or file. Examples of features include translation, calculation of printing costs, etc. Some other examples of features include:

1. Automatically populating a spreadsheet or database with up-to-the-minute stock prices, market research, demographic data, etc.;
2. Providing automatic lookup of zipcodes, addresses, phone numbers, etc. right in the context of an application;
3. Allowing users to purchase postage online, and automatically insert the required address information, barcodes, etc. into their document;
4. Connecting the user to an online help system or technical support service (using information about what he or she is actually doing at the moment to guide them to more relevant help resources);
5. Various types of "collaboration" features, which let multiple users share information and work together on a project;
6. Connecting users to consulting services: professional graphic designers could help users with page layout, lawyers could help with the content of legal forms, and so on.

In one embodiment, the invention is launched when the user selects a tool entitled "eServices" while editing a document in the "PUBLISHER" desktop publishing program module. The selection of the "eServices" tool causes the "PUBLISHER" desktop publishing program module to host a web page in a dialog box. The web page may display a number of features or services that may be performed on the user's "PUBLISHER" document. For example, there may be a translation feature to translate the user's "PUBLISHER" document into another language. Of course, there are numerous other features that may be listed on the web page. When the user selects one of the features from the web page, the web page script performs the selected function on the user's "PUBLISHER" document. As will be further described below, in one embodiment of the invention, the web page's script uses the object model of "PUBLISHER" to perform the selected function on the "PUBLISHER" document.

Exemplary Operating Environment

Figure 1:
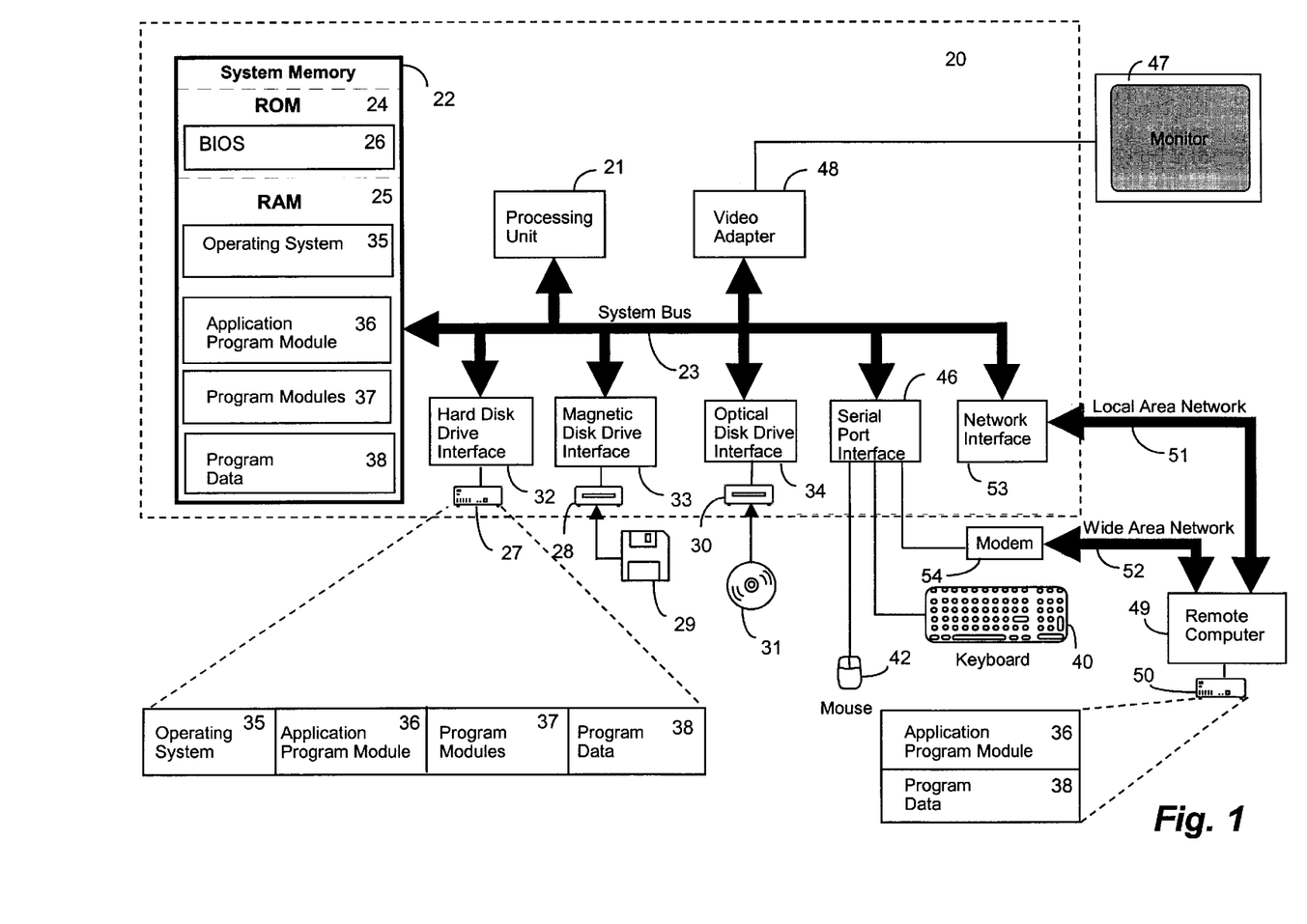
FIG. 1 is a block diagram of a personal computer that provides the operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, an application program module 36, such as Microsoft's "PUBLISHER" desktop publishing program module, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are is often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having described an exemplary operating environment, a background description of macros and DHTML will be provided.

Macros

A macro is a small program that is used to automate some complicated, repetitive, or time-consuming task. Many application program modules allow users to write macros. Macros are typically written in simple, interpreted languages such as VBScript or Javascript. To support macros, an application program module must implement an "object model". An application's object model is the infrastructure that enables a third party program (such as a macro) to manipulate the application's data. In general, each application program module has its own unique object model designed specifically with that application in mind.

Macros are often stored as a part of a data file. For example, a macro may be included as part of a Microsoft "WORD" document file (.doc) or a Microsoft "EXCEL" spreadsheet file (.xls). Macros can also be stored on disk in a separate file. In either case, the macro has full access to the application's object model. Application program modules that support the creation of macros are often said to support "OLE Automation".

Dynamic Hypertext Markup Language (DHTML)

The "INTERNET EXPLORER" web browser, manufactured by Microsoft Corporation of Redmond, Washington, supports an extension to Hypertext Markup Language (HTML) known as Dynamic Hypertext Markup Language, or DHTML. DHTML allows web page authors to include scripts in their web pages. Use of these scripts allows for more interactivity with the user than is possible with normal (static) web pages. These scripts, often referred to as client-side scripts, are typically written in simple, interpreted languages such as VBScript or Javascript.

To support DHTML, the "INTERNET EXPLORER" web browser implements an object model. This object model is specifically designed to allow the script to manipulate the contents of the web page (such as changing the layout of the web page, adding or removing content from the web page, responding to user actions, etc.).

Macros and DHTML Scripts

Macros and DHTML scripts both involve some data (such as a user's document or a web page) and a macro (or script) to manipulate the data via an object model. For both macros and DHTML scripts, the object models are implemented according to the same standard known as "OLE Automation". This means the interactions between an application program module's object model and an application program module macro follows exactly the same protocol as the interactions between a web page's object model and a DHTML script (assuming both the application program module and web page are following the OLE Automation standard).

Having briefly described macros, DHTML and DHTML scripts, a description of several exemplary embodiments of the invention will be described in detail below.

Exemplary Embodiments

Figure 2:
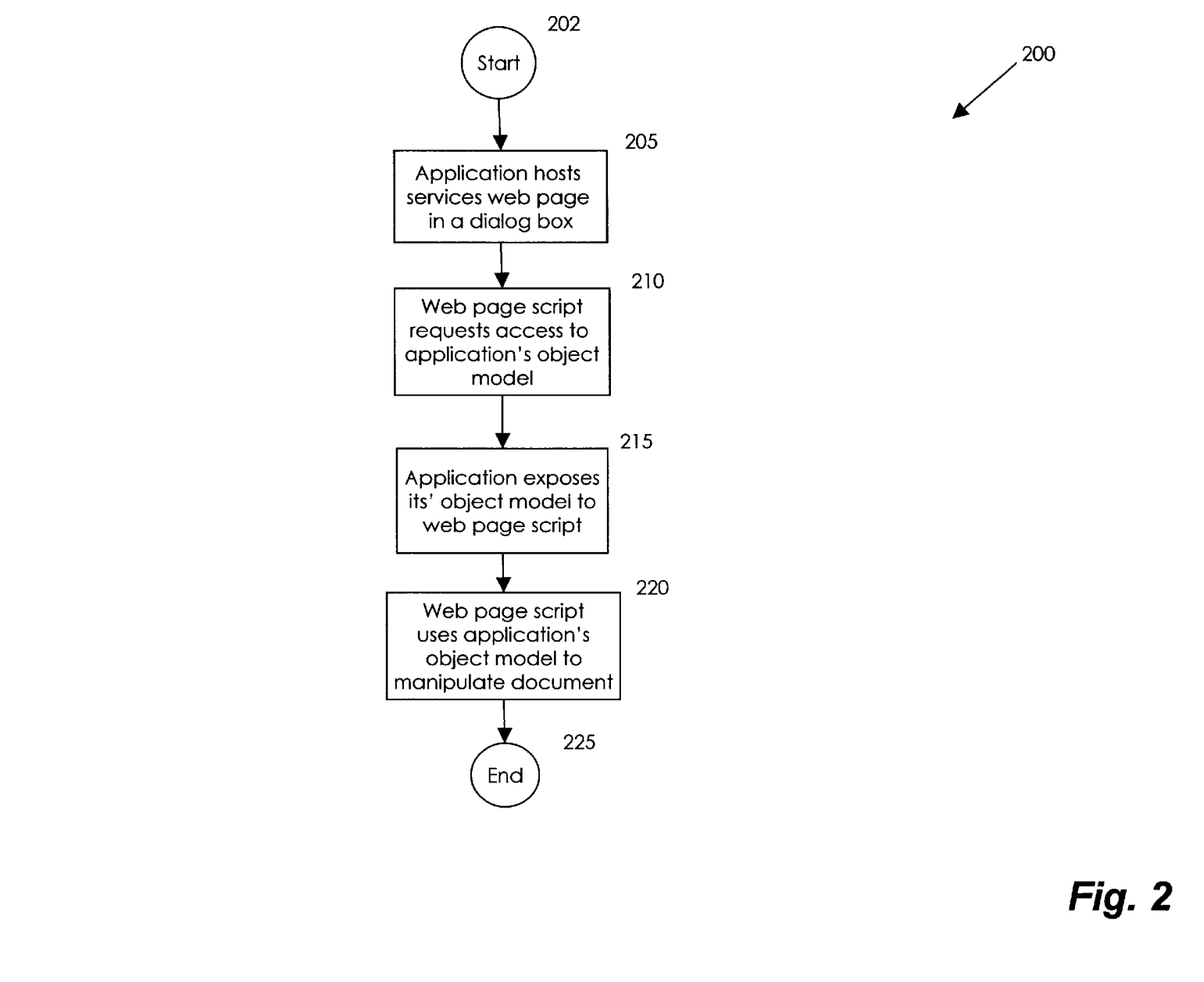
FIG. 2 is a logic flow diagram illustrating a method for providing web-based services to an application program module in accordance with an embodiment of the present invention.

FIG. 2 is a logic flow diagram illustrating a method 200 for providing web-based services to an application program module 36 in accordance with an embodiment of the present invention. Those skilled in the art will appreciate that the logic flow diagram of FIG. 2 is executed by the processing unit 21 (FIG. 1) in response to instructions that have been incorporated into the application program module 36.

The method 200 begins at start step 202 and proceeds to step 205 where an application program module 36 hosts a services web page in a dialog box. The services web page comprises a number of services or features that may be performed on a document, or file, running on the application program module. A feature, or service, will be used herein to refer to an action or manipulation that may be performed on a document or file. For example, one of the services may be a translation engine to translate a document into another language. In one embodiment, the application program module is the "PUBLISHER" desktop publishing program module and the services web page is hosted using the "TRIDENT" program module from Microsoft Corporation of Redmond, Washington. The "TRIDENT" program module is a well-known ActiveX control that manages the downloading, parsing, and displaying of web pages on a local computer. The "TRIDENT" program module forms the core of some web browser programs, such as Microsoft's "INTERNET EXPLORER", and manages the basic functions of downloading and displaying web pages. Thus, only the basic functions of downloading and displaying web pages are run in the dialog box.

To host the "TRIDENT" program module, the application program module 36 must support a collection of Object Linking and Embedding (OLE) Interfaces. The key interface is known as IDocHostUIHandler. The IDocHostUIHandler interface contains a method, which is well-known in the art, called GetExternal that allows the "TRIDENT" program module to generate a connection between the application program module 36 and scripts contained in a web page. To host a web page, the application program module 36 sends a universal resource locator, or URL, to the "TRIDENT" program module so that it knows the location of the web page to download and render. The URL may also contain information specific to the application program module 36 such as the locale or language of the application program module. Using the URL, the "TRIDENT" program module is able to download a web page, parse the HTML and render the web page on the monitor 47.

In one embodiment of the invention, the URL of the services web page hosted at step 205 is provided by the application program module 36 and is a URL for a web page maintained to provide services and features to users of the application program module. Typically, the services web page will be maintained and updated by the manufacturer of the application program module to provide advanced features and updates to their users. However, the URL may be input manually by the user or provided by another source and may be directed to a third party website that provides advanced features for an application program module.

After the application program module hosts the services web page in a dialog box at step 205, the method 200 then proceeds to step 210.

At step 210, a web page script of the services web page requests access to the object model of the application program module 36. As described above, in one embodiment, the services web page comprises a number of different features and services that may be performed on the user's document that is being edited by the application program module. For example, the services web page may allow the user to select a link to translate their document, calculate a printing charge to have their document professionally printed, etc. After the user selects one of these links, then the web page script of the services web page may request access to the object model of the application program module 36 so that it may perform the service requested by the user.

After the web page script of the services web page requests access to the object model of the application program module 36 at step 210, the method then proceeds to step 215.

At step 215, the application program module 36 exposes its object model to the web page script. In one embodiment, the application program module exposes its object model by sending to the web page script a pointer to the application's object model. The method then proceeds to step 220.

At step 220, the web page script uses the application program module's object model to manipulate the document or file being edited by the application program module 36 in accordance with the feature or service selected by the user. The method then ends at step 225.

Figure 3:
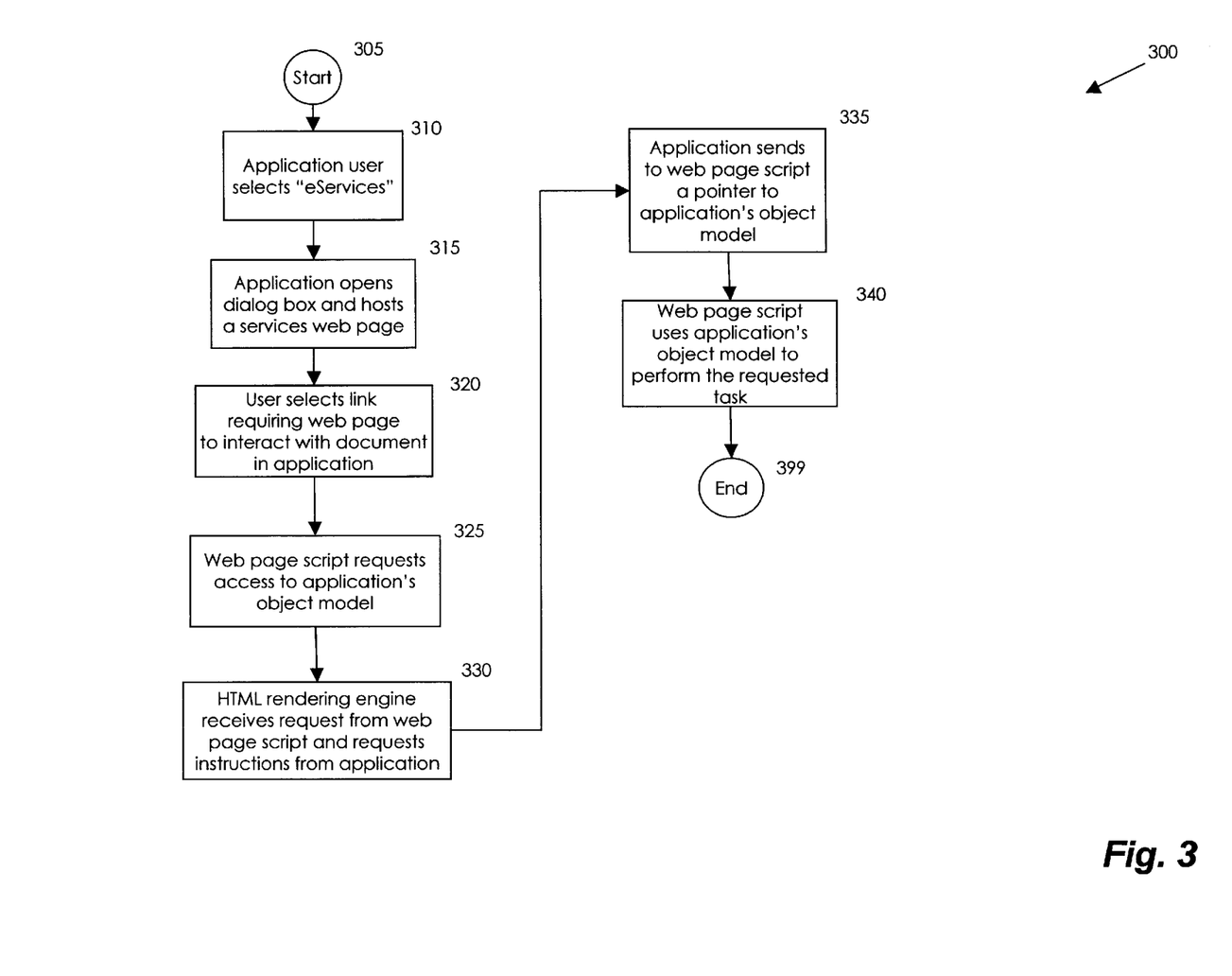
FIG. 3 is a logic flow diagram illustrating a method for providing web-based services to an application program module in accordance with a preferred embodiment of the present invention.

Referring now to FIG. 3, a logic flow diagram illustrating a method 300 for providing web-based services to an application program module in accordance with a preferred embodiment of the present invention will be described.

The method 300 begins at start step 305 and proceeds to step 310 where a user editing a document in an application program module, such as the "PUBLISHER" desktop publishing program module, selects "eServices" from the "Tools" dropdown menu. The "eServices" tool allows a user access to certain features and services that may be performed on their documents. The method 300 then proceeds to step 315.

At step 315, the application program module 36 opens a dialog box and hosts a services web page inside the dialog box using an HTML rendering engine, such as the "TRIDENT" program module. As described above, the "TRIDENT" program module is the HTML rendering engine at the core of Microsoft's "INTERNET EXPLORER" web browser. The "TRIDENT" program module contains all the code required to download a web page from the Internet, parse the HTML and display the web page on-screen. The application program module implements a dialog box that acts as a "TRIDENT" container essentially making the application program module a simple web browser to view the services web page. The services web page may include a number of links comprising the features that are presently available for the user to select. The user may then select a feature from the list.

Referring still to FIG. 3, after the application program module 36 opens a dialog box and hosts the services web page inside the dialog box using the HTML rendering engine, the method proceeds to step 320.

At step 320, the user selects some link or button to select a feature that requires the web page to interact with the document being edited by the application program module and perform some feature or service on the document.

The method then proceeds to step 325 where the web page script of the selected link (or button) requests access to the application program module's object model. Typically, this request is handled by the web page script sending a window.external call to the application program module via the HTML rendering engine. The method then proceeds to step 330.

It should be understood that any web page, including one running in the application program module's "TRIDENT" window, may contain DHTML script (written in a language such as VBScript or Javascript). This DHTML script can interact with the contents of the web page via the object model implemented by the "TRIDENT" program module.

However, in the preferred embodiment of the present invention, the DHTML script running inside the application program module has an added capability. This DHTML script has access to a special object—referred to by the name "window.external"—which is implemented by the application program module. Any time the web page script asks for "window.external", the "TRIDENT" program module will automatically ask the application program module to supply this object. The application program module can use this object to expose its object model—normally only accessible to the application's macros—to the web page's DHTML script. Therefore, any actions that would normally be possible via an application macro are also possible via a web page script using the preferred embodiment of the invention.

At step 330, the HTML rendering engine, such as the "TRIDENT" program module, receives the request from the web page script and requests instructions from the application program module. The method then proceeds to step 335.

At step 335, the application program module sends a pointer to its object model to the HTML rendering engine that, in turn, sends the pointer to the web page script. Of course, for security reasons, the application program module may perform a security verification on the request before sending the pointer to its object model. The method then proceeds to step 340.

At step 340, the web page script uses the pointer to the object model of the host application program module to access the object model and to perform the task requested by the user. The method then ends at step 399.

It should be understood from the foregoing description that the client-side script allows the web page to communicate directly with the application via OLE automation. OLE automation is a well-known mechanism used by scripts (such as those contained in web pages) to interact with other objects.

Figure 4:
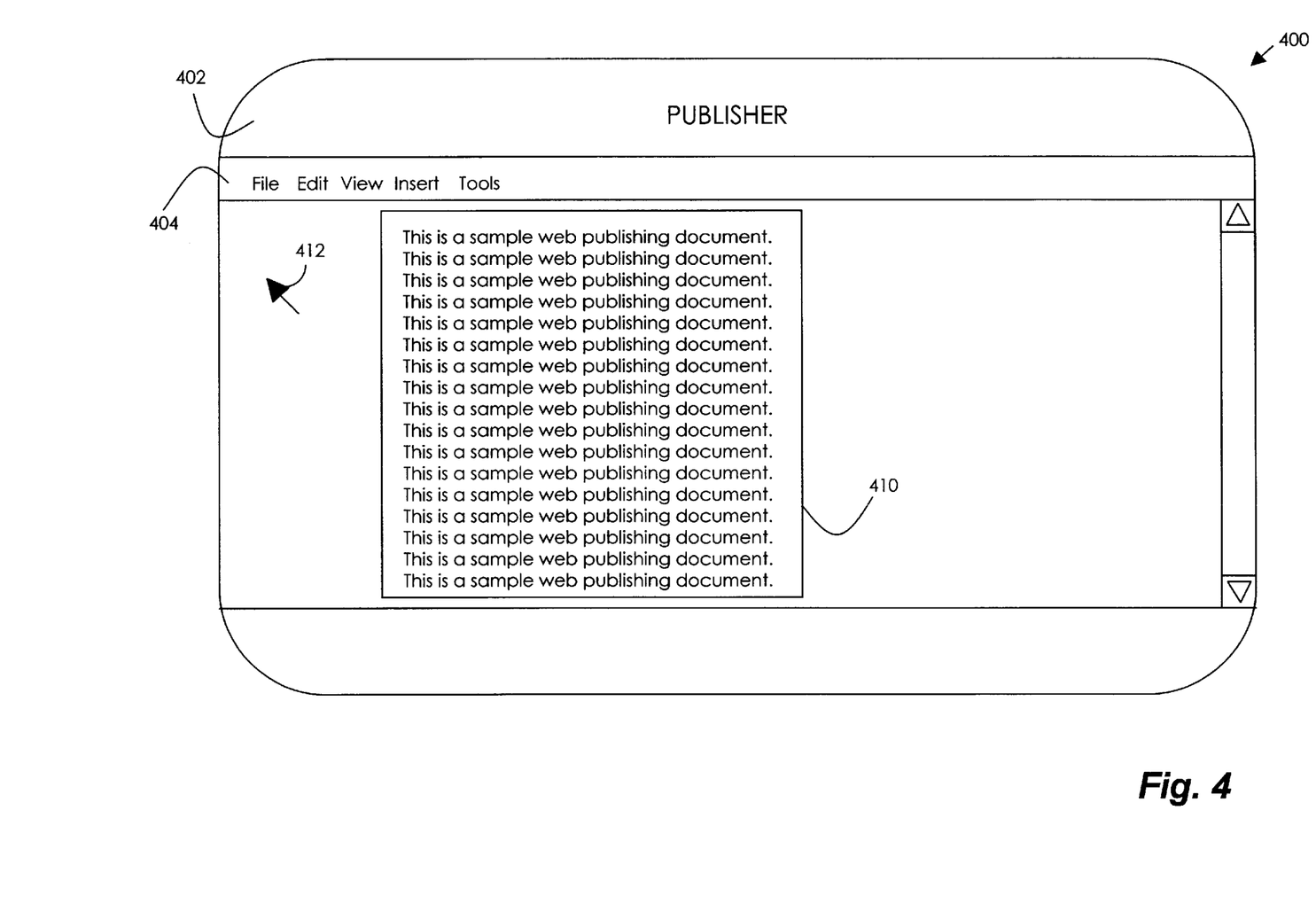
FIG. 4 is an illustration of a window showing a typical screen display in Microsoft's "PUBLISHER" desktop publishing program.

An embodiment of the present invention from the user's perspective will be described in FIGS. 4–6. FIG. 4 is an illustration of a window 400 showing a typical screen display in Microsoft's "PUBLISHER" desktop publishing program. The window 400 includes a title bar 402 and a drop-down menu bar 404. The contents of the user's document are viewed in a viewing area 410. The window 400 also contains a pointing device 412 which allows the user to select objects within the window or issue commands.

Figure 5:
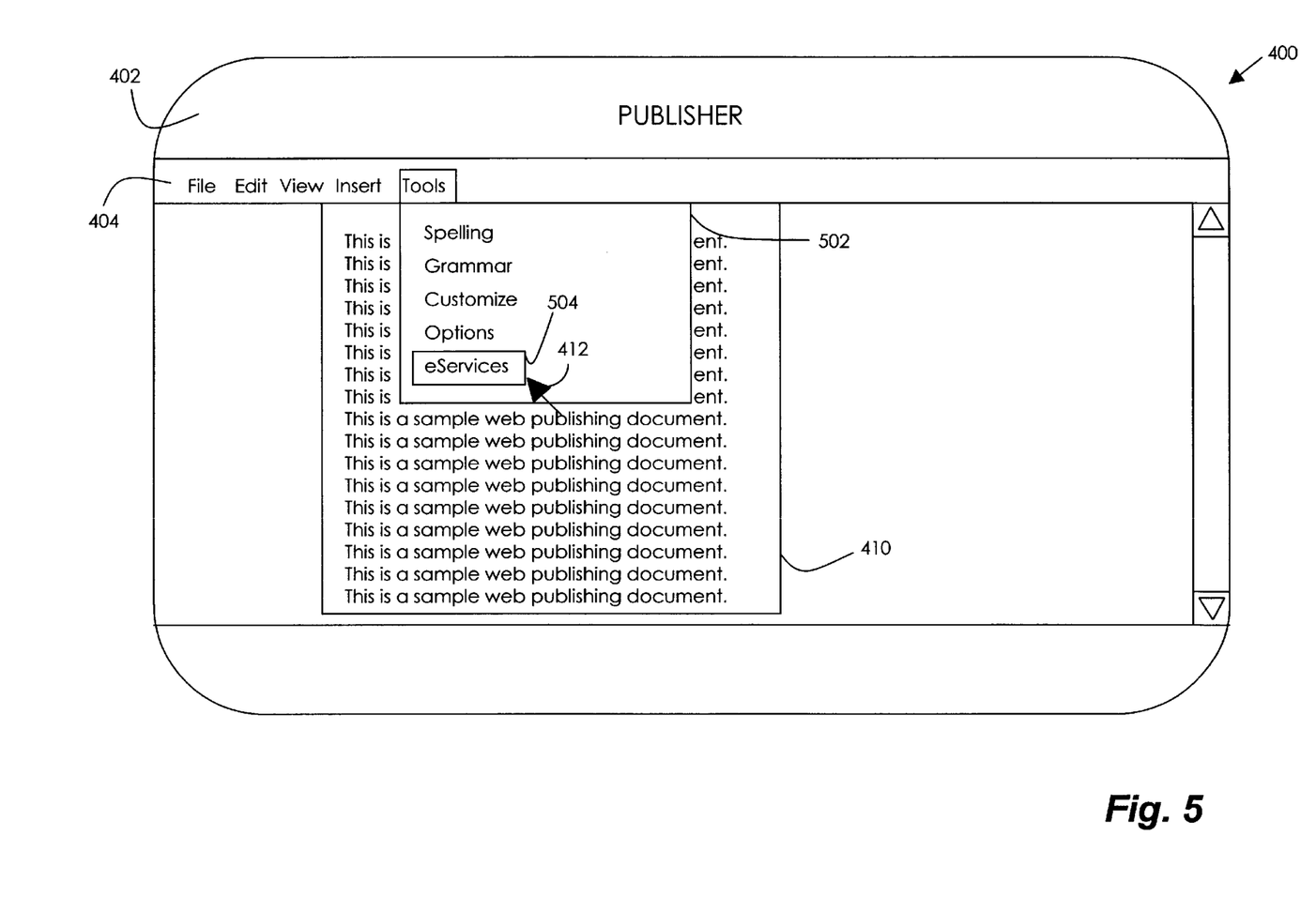
FIG. 5 is an illustration of a typical screen display in Microsoft's "PUBLISHER" desktop publishing program illustrating the selection of the command to use the "eServices" tool which implements an embodiment of the present invention.

FIG. 5 is an illustration of a typical screen display in Microsoft's "PUBLISHER" desktop publishing program illustrating how the user selects the command to use the "eServices" tool which implements an embodiment of the present invention. The user selects the Tools option from the drop-down menu bar 404 using the pointing device 412. Upon selection of the Tools option, a drop-down window 502 appears with a list of various tools that may be used with the document. Using the pointing device 412, the user then selects the "eServices" tool 504 from the drop-down menu 502.

Figure 6:
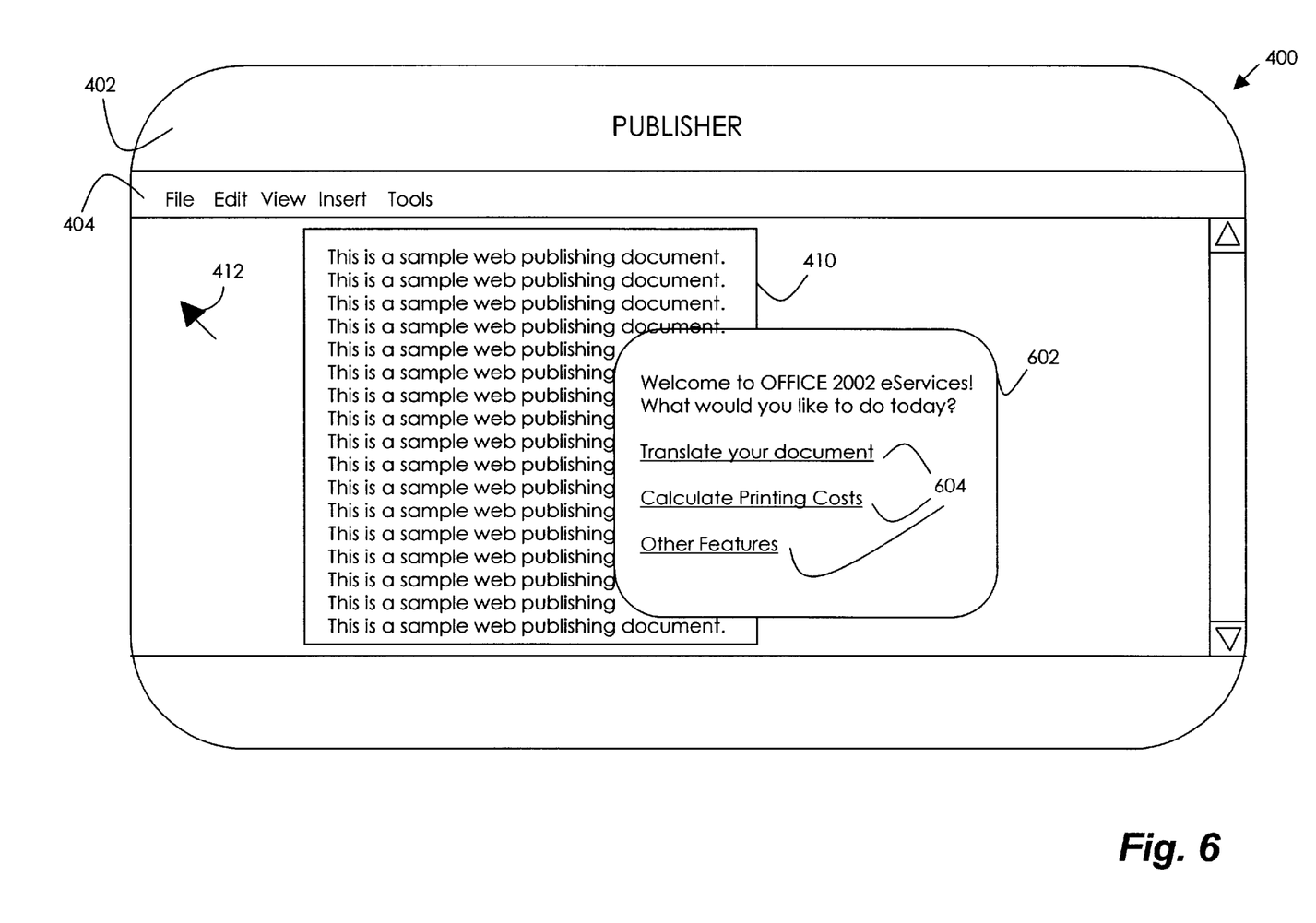
FIG. 6 is an illustration of a window displaying an electronic file and a dialog box displaying the services web page in accordance with an embodiment of the present invention.

FIG. 6 is an illustration of the window 400 displaying the user's document and a dialog box 602 illustrating the services web page. The dialog box 602 appears in response to the user selecting the "eServices" tool 504 (FIG. 5). When the user selects the "eServices" tool, the application program module launches an HTML rendering engine, such as Microsoft's "TRIDENT" program module, from within the application program module. The application program module hosts the HTML rendering engine in the dialog box 602. Typically, the HTML rendering engine manages the basic functions of downloading and displaying web pages. Having a web authoring tool host the HTML rendering engine in a dialog box 602 eliminates the need for the user to exit the application program module and open a separate web browser application program to access the services web page.

The dialog box 602 hosts a services web page that may comprise one or more features 604 (or services) that may be performed on the user's document (shown in viewing area 410). Typically, the features 604 are listed as links or buttons that will direct the HTML rendering engine to another web page that is then displayed in dialog box 602. After one of the links or buttons (and its associated web page) is selected, the web page script of the associated web page will implement the feature in accordance with an embodiment of the invention as previously described. Of course, in addition to buttons and links, features may use any number of different types of user input and may require the user to enter all sorts of data such as a name, address, credit card information, etc. The numerous implementations of features and services will be obvious to those skilled in the art.

It should be understood from the foregoing description that, in one embodiment, the present invention allows a web page script(s) to manipulate a document, such as a "PUBLISHER" publication, running on an application program module. It should also be understood from the foregoing description that exposing an application's object model to a web page's client-side script opens up numerous beneficial scenarios.

Web page authors may write DHTML script that requests access to an application program module's object model. Using an embodiment of the present invention, if this access is granted (at the discretion of an application program module's security settings), the DHTML script will receive a pointer to the entry point of the application program module's object model, such as Iapplication (the entry point into the "PUBLISHER" object model).

It should be understood that in the foregoing description of a preferred embodiment of the present invention, the application program module is the "PUBLISHER" desktop publishing application program module. However, those skilled in the art will appreciate that other application program modules including, but not limited to word processor program modules or spreadsheet program modules, may be used without departing from the scope of the present invention. Therefore, although the foregoing description dealt with Microsoft's "PUBLISHER" application program module, it should be understood that the present invention is not limited by a specific type of program module and may be implemented between any web page and any application program module.

It should be understood that by hosting the services web page in a dialog box of the application program module, the application has more control over security than if the services were implemented via a similar mechanism using a stand-alone web browser, such as Microsoft's "INTERNET EXPLORER". For example, the application program module can restrict the user to browsing to only "approved" web pages. The application program module may also adjust various aspects of the user's Internet security settings (such as turning on or off ActiveX controls, modifying Java settings, etc.).

The application program module may also provide context information to the hosted services web page. For example, the application program module may pass a list of keywords that describe the tasks the user is performing in the application program module. The services web page may then tailor its content to the task at hand. For example, if the user is writing a resume, then the services web page could automatically offer services related to job searches, interviewing, etc. It should be understood that through the use of cookies or a modified URL, this context information may be sent to the services web page. For example, the application id, locale id, and templates/wizards keywords may be used as context information. The services web page may also be customized based on a user's preferences (stored as cookies).

Although all of the possible embodiments of the present invention are too numerous to describe, the following scenarios provide some examples of additional embodiments of the present invention that are possible.

One example of an embodiment of the present invention is determining the cost of having a document printed professionally. Suppose a user creates a newsletter by using the "PUBLISHER" application program module. The user may select the "eServices" tool and then select a "Determine Price for Printing" feature or a similar feature. Of course, alternatively, the user could enter the web address of a commercial print shop's website. In either case, an HTML rendering engine running inside a dialog box in "PUBLISHER" is directed to a web page. The web page is allowed access to "PUBLISHER"'s object model and automatically counts the number of pages in the user's publication, determines what size paper the newsletter needs to be printed on and determines what spot colors are in use. The web page may then immediately give the user a quote on having the publication printed. At the user's request, the script of the web page could also upload the publication to the print shop's computer for printing.

Another example of an embodiment of the present invention is managing a company's intranet. Suppose department heads from around a company use "PUBLISHER" to create their department homepages. The head of information services may want each department homepage to include a company-wide standard navigation bar. The head of information services may set up a web page which automatically adds this navigation bar to each of the department homepages. This may be implemented using an embodiment of the present invention. Each department head launches "PUBLISHER" and visits the web page created by the head of information services. The script of the web page then uses "PUBLISHER"'s object model to add the navigation bar to the department head's homepage.

As should be understood from the foregoing description, an embodiment of the present invention may be used to provide on-line services or features. These features may be edited or updated quickly and easily by simply changing the DHTML scripts on the services web page. No installation of new software is required when a change is made to a feature or a new feature is added because the web page scripts implements the features rather than software that is downloaded to the user's computer. So, new features may be released without a rollout of a new disc release.

It should also be understood the present invention is highly discoverable to the user because it is a listed in the Tools drop-down menu. The present invention also simplifies many features because the performance of features requires simply clicking on the feature. For example, clicking on the "Translate" feature on the services web page may perform complete translation services. The user does not have to exit their application program and then send their document to a translation service. Instead, the user simply clicks on the "Translate" link on the services web page.

Another advantage provided by an embodiment of the present invention is that it allows features to be dynamic. For example, a feature may be tied to dynamic real-world data such as stock prices. Another advantage provided by the present invention is that it is seamless to the user. The user does not have to realize that they are dealing with a website.

In one embodiment, the invention allows accessing the services web page using the application program module instead of through a separate web browser. This allows the user to access and use features directly from the services web page without having to exit the application and open a separate web browser program. Therefore, the number of steps required to execute features is greatly reduced and simplified.

It should be understood that the foregoing pertains only to the preferred embodiments of the present invention, and that numerous changes may be made to the embodiments described herein without departing from the spirit and scope of the invention.

I claim:

1. A method of an application program module for using a web page to provide a feature to a document running on the application program module comprising the steps of:
   hosting the web page in a dialog box of the application program module;
   receiving a request from the web page for access to an object model of the application program module;
   exposing the object model to the web page; and
   responding to a web page script running on the web page, wherein the web page script uses the object model of the application program module to implement the feature.

2. The method of claim 1 wherein the step of exposing the object model of the web page comprises sending to the web page a pointer to the object model of the application program module.

3. The method of claim 2 wherein the request from the web page comprises a window.external request.

4. The method of claim 2 wherein the pointer comprises an Iapplication request.

5. The method of claim 1 wherein the web page script is a Dynamic Hypertext Markup Language (DHTML) script.

6. The method of claim 5 wherein the object model of the application program module and the DHTML script are implemented according to the OLE Automation standard.

7. The method of claim 1 wherein the step of hosting the web page in a dialog box of the application program module comprises using an HTML rendering engine to open and render the web page in the dialog box of the application program module.

8. The method of claim 7 wherein the HTML rendering engine is a "TRIDENT" program module.

9. A computer-readable medium having computer-executable instructions for performing the steps recited in claim 1.

10. The method of claim 1 further comprising the step of providing context information to the web page.

11. The method recited in claim 10 wherein the context information comprises a plurality of keywords describing the task being performed on the application program module immediately before hosting the web page in the dialog box of the application program module.

12. The method recited in claim 11 wherein a plurality of cookies are used to provide the context information to the web page.

13. A method for providing web-based services to a file of an application program module, comprising the steps of:
   at an application program module,
      hosting a web page comprising a web page script in a dialog box of the application program module;
   at the web page script,
      sending to the application program module a request for access to an object model of the application program module;
   at the application program module,
      receiving the request from the web page script for access to the object model of the application program module;
      exposing the object model to the web page script;
   at the web page script,
      using the object model to generate instructions to perform a web-based service;
      sending the instructions to the application program module;
   at the application program module, and
      responding to the instructions by manipulating the file in accordance with the web page script's instructions.

14. The method of claim 13 wherein the step of hosting a web page comprising a web page script in a dialog box of the application program module is performed in response to receiving a request for web-based services.

15. The method of claim 14 wherein the request comprises user input selecting an "eServices" tool from a tools menu.

16. The method of claim 13 wherein the step of hosting a web page comprising a web page script in a dialog box of the application program module is performed by the application program module using an HTML rendering engine.

17. The method of claim 13 wherein the step of sending to the application program module a request for access to an object model of the application program module is performed in response to the web page script receiving a request for a web-based service.

18. The method of claim 17 wherein the request for a web-based service comprises a user selecting a service from a plurality of services listed on the web page.

19. The method of claim 13 wherein the step of exposing the object model to the web page script comprises sending to the web page script a pointer to the object model.

20. The method of claim 16 wherein the step of receiving the request from the web page script for access to the object model of the application program module comprises the HTML rendering engine receiving the request from the web page script and requesting instructions from the application program module.

* * * * *

UNITED STATES PATENT AND TRADEMARK OFFICE
CERTIFICATE OF CORRECTION

PATENT NO.     : 6,632,249 B2
DATED          : October 14, 2003
INVENTOR(S)    : Pollock It is certified that error appears in the above-identified patent and that said Letters Patent is hereby corrected as shown below:

<u>Column 4,</u>
Line 50, delete the word "is".

Signed and Sealed this

Twenty-seventh Day of January, 2004

JON W. DUDAS
*Acting Director of the United States Patent and Trademark Office*